Feb. 12, 1963 W. F. FROST 3,077,595
ANTENNA BEAM SHARPENING
Filed May 24, 1961 3 Sheets-Sheet 1

*INVENTOR.*
WILLIAM F. FROST
BY
ATTORNEY

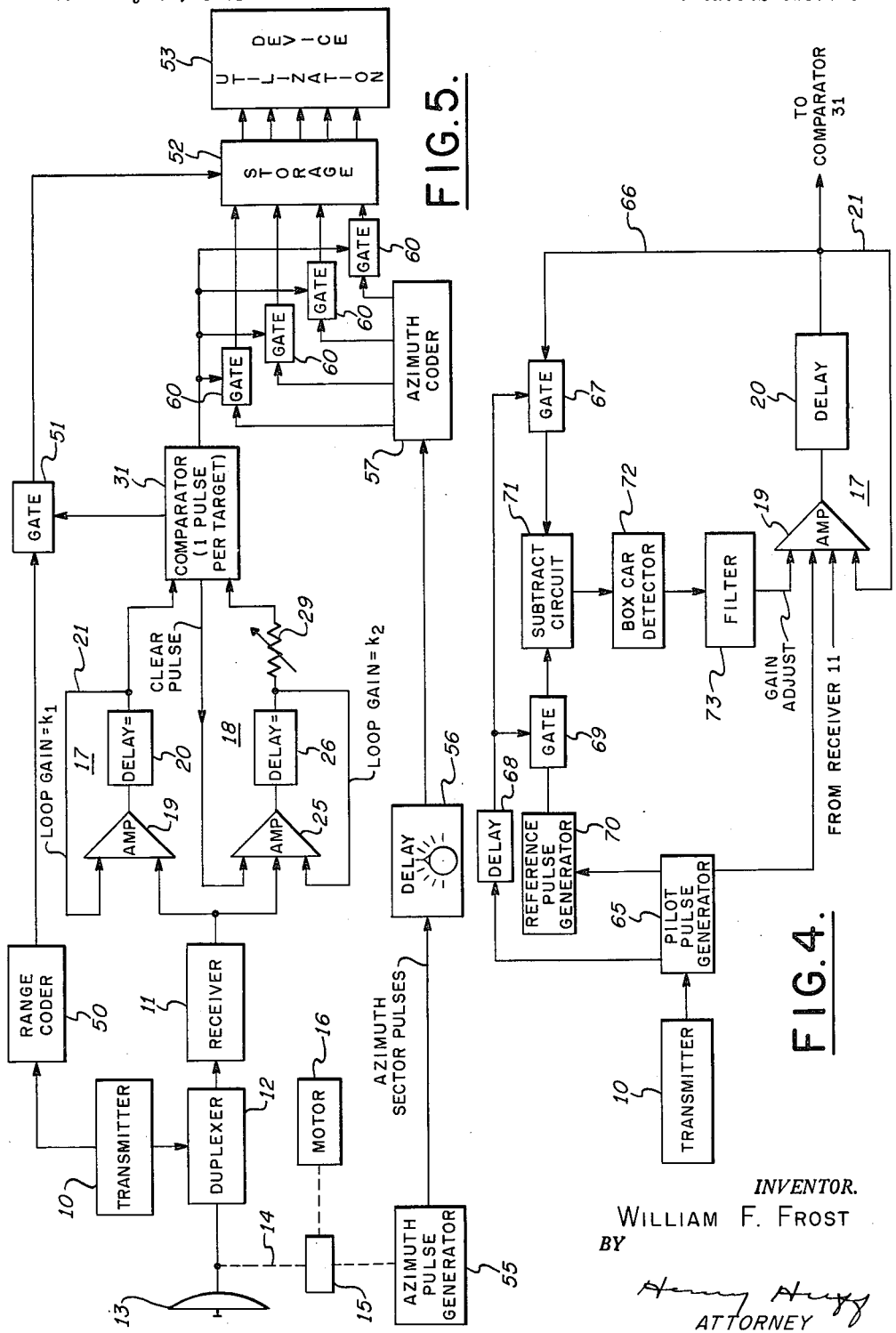

United States Patent Office 3,077,595
Patented Feb. 12, 1963

3,077,595
ANTENNA BEAM SHARPENING
William F. Frost, Stewart Manor, N.Y., assignor to Sperry Rand Corporation, Great Neck, N.Y., a corporation of Delaware
Filed May 24, 1961, Ser. No. 112,277
4 Claims. (Cl. 343—11)

This invention relates to pulsed, scanning-type object locating systems, and relates in particular to means for deriving accurate azimuth information by producing from a series of echo pulses received from a given object a single output pulse which is indicative in the exact azimuth position of the detected object.

In azimuth scanning-type radar systems the pulse repetition frequency is much greater than the scanning rate of the antenna beam so that a considerable number of echo pulses are received at the receiver each time the antenna beam scans past a remotely located object. Because of this, the azimuth position of the detected object is represented by a series of pulses which commences when the leading edge of the scanning antenna beam first intercepts the object and terminates when the trailing edge of the antenna beam sweeps past the object. Because of the sweeping of the antenna beam past a given object the successive pulses from that object will vary in amplitude in a manner that approximates a Gaussian distribution, that is, the first received pulses of the group will be low in amplitude as the antenna beam leading edge intercepts the object, the later received pulses will progressively increase in magnitude as the center of the beam approaches the object, and then the magnitude of the pulses will decrease as the trailing edge of the beam sweeps past the object.

In some radar systems the presentation of multiple echo returns is not objectionable, and in fact may be desired in order to obtain video integration on a cathode ray tube indicator. One disadvantage of displaying the entire series of received echo pulses is that the pulses are received throughout the interval during which the antenna beam is scanning through some finite azimuth angle determined by the antenna pattern beamwidth, and thus the exact azimuth angle of the detected object is not precisely indicated. In scanning systems where it is required that the exact azimuth information be determined, and in particular in systems in which the radar information is handled by means of digital processes, it is desired that the system produce but a single output pulse which is indicative of the exact azimuth position of the detected object.

It therefore is an object of this invention to provide in a scanning-type pulsed object locating system means for producing a single output pulse which is indicative of the exact position of the detected remotely located object.

It is another object of this invention to derive from a series of return echo pulses which are produced when a scanning antenna beam sweeps past a remotely located object, a single output pulse which is indicative of the position of the beam when it is substantially centered on the object.

It is another object of this invention to provide a single output pulse each time a scanning antenna beam sweeps past a remotely located object.

It is a further object of this invention to produce from a series of pulses a single pulse having a known time relationship with respect to the individual pulses of said series.

These and other objects and advantages of this invention, which will become more apparent from the specification and claims below, are achieved by coupling the series of received pulses from a given target to each of two recirculating delay line integrators having different loop gains, that is, different time constants. The integrator with the shorter time constant (first integrator) will produce an integrated version of the input series of pulses wherein the pulse of maximum amplitude in the integrated version is delayed a time $t_2$ with respect to the maximum amplitude pulse of the input series. Similarly, the maximum amplitude pulse of the integrated version from the longer time constant integrator (second integrator) will be delayed a time $t_3$ with respect to the maximum amplitude pulse of the input series of pulses. The pulses from the second integrator are attenuated so that a pulse from the second integrator does not exceed the magnitude of a simultaneously occurring pulse from the first integrator until some known time during the occurrences of said two series. The series of attenuated pulses and the series of pulses from the first integrator are coupled to a comparator circuit which produces an output only when the magnitude of an attenuated pulse from the second integrator exceeds the magnitude of a pulse from the first integrator. The time of occurrence of this condition may be determined from the characteristics of the input series of pulses and from the characteristics of the integrators. The first output pulse from the comparator is coupled back to the second integrator and clears therefrom the circulating pulse. This assures that just one output pulse will be received from the comparator during each series of input pulses.

The present invention will be described by referring to the accompanying drawings wherein.

Figure 2:
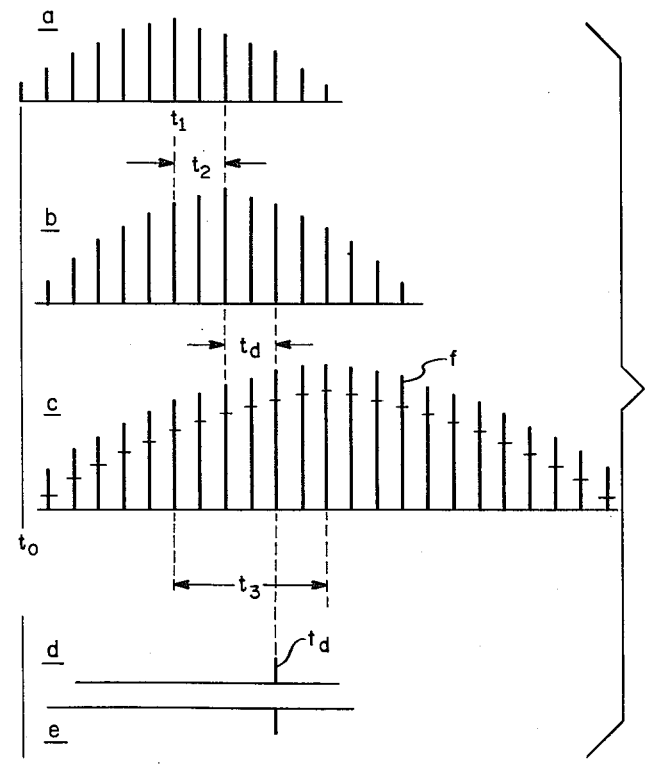
FIG. 2 illustrates series of pulses which are used to help explain the operation of the radar system of FIG. 1.

The pulse repetition frequency of transmitter 10 is considerably greater than the azimuth rotational frequency of antenna 13 so that as the antenna beam sweeps past a remotely located object a series of pulses will be reflected from the object back to the antenna 13, through duplexer 12 and will be detected in receiver 11. The envelope of the series of pulses from receiver 11 will vary in magnitude in the manner illustrated in FIG. 2a, this variation approximating a Gaussian distribution, as is well known. The series of pulses of FIG. 2a is coupled to the input of each of two recirculating delay line integrators 17 and 18. Integrator 17 is comprised of an input amplifier 19 whose output is coupled to a delay means 20. The output of delay means 20 is coupled over lead 21 as a positive feedback signal to a second input of amplifier 19. Integrator 18 is similar to integrator 17 and is comprised of amplifier 25, delay means 26, and feedback lead 27. The circulating delay intervals of both the recirculating delay line integrators 17 and 18 are substantially equal to the pulse repetition interval of transmitter 10. The loop gain of integrator 17 is equal to $k_1$, and the loop gain of integrator 18 is $k_2$, wherein $k_2$ is greater than $k_1$ and both are less than one. The output of integrator 17 is coupled to comparator 31 and the output of integrator 18 is coupled through a variable attenuator 29 to said comparator 31. Comparator 31 operates in response to simultaneously occurring pulses from integrators 17 and 18 to produce an output pulse, FIG. 2d, on lead 32 only when a pulse from integrator 18 is greater in magnitude than the simultaneously occuring pulse from integrator 17.

The output series of pulses from integrators 17 and 18 are illustrated respectively in FIGS. 2b and 2c. The amplitudes of the pulses of FIG. 2c along the broken line $f$ are the amplitudes of the attenuated output pulses from attenuator 29, FIG. 1. At the conclusion of time interval $t_d$ in FIGS. 2b and 2c, the magnitude of an attenuated pulse from the output series from integrator 18 first exceeds the magnitude of a pulse from integrator 17, FIG. 2b. It may be seen that the envelopes of the series of output pulses from the two integrators are delayed with respect to the envelope of the input series of pulses of FIG. 2a, the delay in each of the integrators being a function of the loop gain $k$, or time constant, of that integrator and of the number of pulses returned from a target (hits). The delay times of the integrators, and thus the time interval $t_d$ after which a pulse is produced by comparator 31, may be determined from equations expressing the responses of the integrators. With an input series of pulses having approximately a Gaussian time envelope, the magnitude of the envelope $V_0$ of the integrated output series of pulses, as a function of the beam azimuth position $z$ relative to the target azimuth position (normalized with respect to $x$, a half-beamwidth), may be expressed as $$\frac{V_0}{P} = \frac{N}{2} \int_{-\infty}^{z} (\epsilon^{-0.7x^2}) \left( k^{\frac{N}{2}(z-x)} \right) dx \quad (1)$$

where P is the peak signal voltage which would be received by a nonscanning antenna, N is the number of hits returned from the target, $k$ is the loop gain of the integrator and $x$ is the normalized beamwidth of the antenna beam and is equal to two between the half-power points, i.e., $x = \pm 1$.

Equation 1 reduces to $$\frac{V_0}{P} = \left( .53Nk^{\frac{Nz}{2} + .09N^2 \ln k} \right) (1 + Ip(.835z + .30N \ln k)) \quad (2)$$

where $Ip$ is probability integral $$\frac{2}{\sqrt{\pi}} \int_{0}^{x} \epsilon^{-x^2} dx$$

Figure 3A:
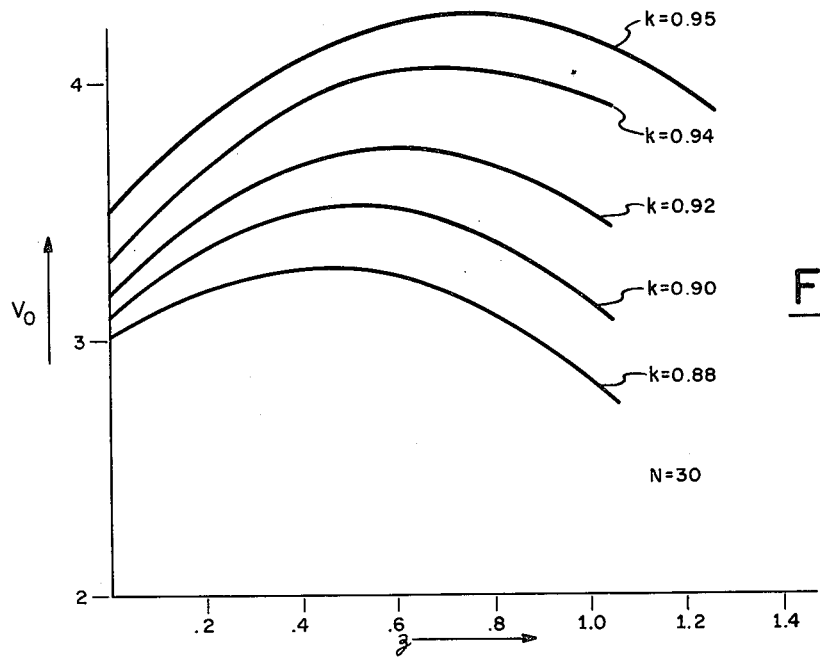

FIG. 3a is plotted from Equation 2 and shows the magnitude and delay of the envelope of the series of output pulses from a recirculating delay line integrator for several different values of loop gain $k$. The curves of FIG. 3a show that as the loop gain $k$ increases, the magnitude of the pulses increase and that the pulse of maximum amplitude (maximum point on the curves) will occur progressively later, that is, as the exact beam center is further beyond the target. The 0 point on the abscissa axis corresponds to the beam center being exactly on the target, and the 1.0 point on that axis corresponds to the beam center being one-half beamwidth beyond the target. For example, with a loop gain of $k = .88$, the maximum amplitude pulse would not appear at the output of the integrator until the antenna beam center was approximately four-tenths of the half-beam width beyond the exact target azimuth position, and for a loop gain equal to .95 the maximum amplitude pulse would not appear until the beam center was approximately seven-tenths of the half-beamwidth beyond the exact target azimuth position.

Figure 1:
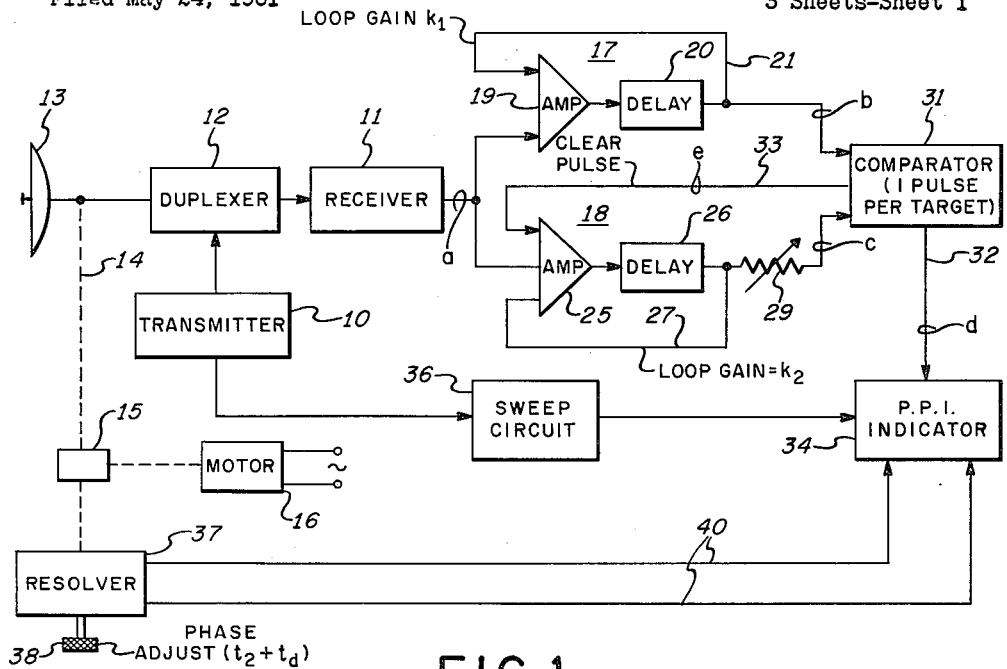
FIG. 1 is a simplified block diagram of a conventional search-type radar system employing the present invention for azimuth sharpening.

Returning again to the description of FIG. 1, the first output pulse from comparator 31, FIG. 2d, is coupled over lead 32 to PPI indicator 34 to present a visual indication of the target. The indicator portion of the system is conventional and includes sweep circuit 36 which operates in response to transmitter pulses to provide sweep voltage waveforms for radially deflecting the electron beam of indicator 34. Quadrature sine waves are coupled from resolver 37 over leads 40 to produce the angular deflection of the electron beam in indicator 34. The rotor member of resolver 37 is mechanically coupled to gear box 15 and operates in synchronism with scanning antenna 13. Resolver 37 includes a phase adjusting knob 38 for delaying the phase of the quadrature sine waves by an amount to correspond to the time delay $(t_2 + t_d)$ which elapses from the time of occurrence of the maximum amplitude pulse of the input series of pulses to the integrators, $t_1$ FIG. 2a, and the occurrence of the output pulse from comparator 31, the conclusion of the time interval $t_d$ FIGS. 2b–2d. In this manner, the single output pulse from comparator 31 will produce an indication of a target on indicator 34 at the exact same azimuth indication as the location of the target when it was intercepted by the center of the scanning antenna beam.

No time compensation is required in the range presentation of a target because the recirculation time of received pulses in the integrators is equal to the pulse repetition interval of transmitter 10, and because the output from the comparator 31 occurs substantially simultaneously with the application of pulses thereto. Thus, the successive occurrences of a recirculating pulse at the output of an integrator will not change in time relative to the occurrences of successive transmitter pulses.

The first output pulse of comparator 31 also is coupled over lead 33 and appears as a negative feedback signal, FIG. 2e, at the input of amplifier 25 in integrator 18. This feedback signal may be a negative pulse whose amplitude is greater than the amplitude of the recirculating pulses in integrator 18. This has the effect of clearing from recirculating delay line integrator 18 the positive pulse recirculating therein, thus assuring that only one output pulse is obtained from comparator 31 during each scan of a target.

Figure 3B:
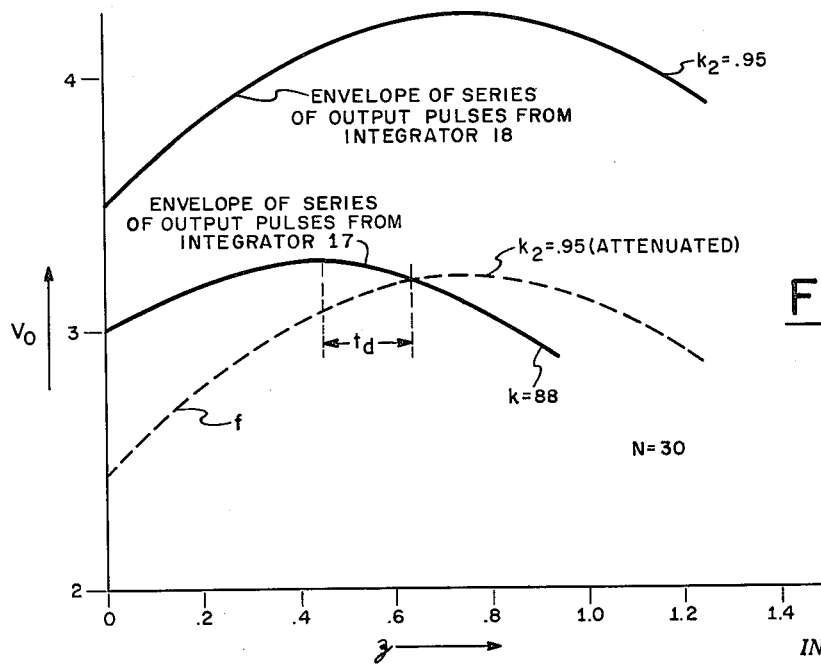

In the operation of the system illustrated in FIG. 1, a series of pulses having approximately a Gaussian time envelope, FIG. 2a, is received by receiver 11 as the beam of scanning antenna 11 scans past a remotely located target. This series of pulses is coupled to each of the integrators 17 and 18 whose loop gains are $k_1$ and $k_2$. The response of the two integrators is illustrated in FIGS. 2b, 2c and 3b. The maximum amplitude pulse in the output series of pulses from integrator 18 are greater in magnitude and are delayed longer in time than the maximum amplitude pulse of the series of pulses circulating in integrator 17, due to the longer time constant of integrator 18. The output of integrator 17 is coupled to comparator 18, and the output of integrator 18 is attenuated by variable resistor 29 so that the magnitude of the output pulses therefrom will follow along the broken lines "f" of FIGS. 2c and 3b. The variable resistor 29 is adjusted so that the first pulse of the output series of pulses from integrator 18 which exceeds the magnitude of a simultaneously occurring pulse of the output series from integrator 17 will occur at a time interval $t_d$ after the occurrence of the maximum amplitude pulse from integrator 17 at time $t_2$. At this time, comparator 31 will respond to the input pulses to produce the output pulse of FIG. 2d which is coupled to indicator 34. At the same time, the negative pulse of FIG. 2e is coupled over lead 33 to the input of amplifier 25 and will circulate in integrator 18. The combination of the negative clear pulse and the positive target pulses will operate to clear the positive pulse recirculating in the integrator 18. The negative feedback pulse on lead 33 is of such an amplitude that subsequent positive pulses received from receiver 11 during the scanning of the same target will not build up to sufficient amplitude to exceed the magnitude of a simultaneously occurring positive pulse in integrator 17. Comparator 31 therefore will not produce any more output pulses during the scanning of that target.

The phase adjustment knob 38 of resolver 37 is adjusted to provide a phase delay in the quadrature sine waves coupled over leads 40 to equal the time $(t_2 + t_d)$. With these conditions existing, a single well-defined target will appear on indicator 34 at an azimuth angle corresponding to the position of the target when it was intercepted by the center of the scanning antenna beam.

It is to be understood that other means may be employed for clearing the recirculating positive pulse from integrator 18, and other phase adjusting means may be used in cooperation with resolver 37 to provide the correct phase adjustment of the quadrature sine wave outputs of resolver 37.

The accuracy of the system of FIG. 1 is critically dependent upon the loop gains $k_1$ and $k_2$ of integrators 17 and 18. Therefore, automatic gain control circuits should be employed with each of the integrators. Suitable automatic gain control circuits for this use are known to those skilled in the art. One possible embodiment of a circuit for automatically controlling the gain of an integrator is illustrated in FIG. 4 wherein pilot pulse generator 65 operates in response to transmitter 10 to produce during the dead time in the radar pulse repetition interval a calibrating pulse which is coupled to amplifier 19 of integrator 17. This calibrating pulse circulates in integrator 17, and a sampled version thereof is coupled over lead 66 to normally-closed gate 67. Pilot pulse generator 65 also produces an enabling pulse which enables normally-closed gates 67 and 69, and prior to its application to said gates, this enabling pulse is delayed in delay means 68 for a time interval equal to several radar pulse repetition intervals. This delay is provided to allow the calibrating pulse produced during the radar dead time to circulate several times around integrator 17 and thus at least partially build up to a steady level which it will attain after a number of circulations around integrator 17. The calibrating pulse from pilot pulse generator 65 also is coupled to reference pulse generator 70 which produces a corresponding pulse at a controlled amplitude which is the desired amplitude of the output pulses from integrator 17 when its loop gain is properly adjusted and the pulses have reached their steady level. The controlled amplitude pulses passed by gate 69 upon the occurrences of the enabling pulses from delay means 68, and the integrator output pulses passed by gate 67 in response to the same enabling pulses are coupled to a subtracting circuit 71 whose output is the difference in signal level between pulses applied simultaneously upon its input. The difference signal pulses from subtracting circuit 71 are coupled to box car detector 72 which preserves on a pulse to pulse basis the difference in signal level between the two inputs to subtracting circuit 71. The output of box car detector 72 is smoothed in filter 73 and is coupled to the gain adjust terminal of amplifier 19 to control the gain thereof to assure the loop gain of integrator 17 is maintained at the proper value. Similar automatic gain control means may be employed with integrator 18.

Although the operation of the system of FIG. 1 has been described in reference to a single detected target, it will operate equally well in the presence of multiple targets because the series of pulses from each target may recirculate in each of the integrators 17 and 18 independently of the series of pulses from other targets.

FIG. 5 is a simplified block diagram illustrating the use of the present invention in a scanning radar system adapted to handle the radar information in digital form. The transmitting and receiving portion of the system of FIG. 5, as well as recirculating delay line integrators 17 and 18 and comparator 31 are identical to the correspondingly numbered components of FIG. 1, and operate in the same manner as previously described to produce a single output pulse at a known time in response to the series of input pulses returned from a scanned target. The remainder of the system of FIG. 5 operates to provide range and azimuth information in digital form and is comprised of a range coder 50 which operates in synchronism with the pulses produced in transmitter 10 to provide a continuously changing digital range code which corresponds to the continuously increasing range of a transmitted pulse radiated by antenna 13. Range coder 50 is adapted to automatically reset to zero after a code corresponding to the maximum range of interest has been reached during each pulse repetition interval. The output of range coder 50 is coupled to a normally closed gate 51. Gate 51 is enabled by the output pulses of comparator 31 to pass to storage means 52 the digital range code corresponding to an intercepted target.

Azimuth information in digital form is generated by the components comprising azimuth pulse generator 55 which operates in synchronism with scanning antenna 13 to produce a series of azimuth sector pulses whose rate is proportional to the rate of scan of antenna 13.

In an embodiment of the invention in which antenna 13 is mechanically rotated in azimuth, azimuth pulse generator 55 may take the form of a gear tooth counter comprised of a magnetic pick-up means which produces a pulsed output each time a tooth of a gear in the azimuthal rotation mechanism passes immediately adjacent thereto. The output pulses from azimuth pulse generator 55 are delayed in time in delay means 56 by an amount $(t_2+t_d)$, see FIG. 2, to account for the delay times in integrators 17 and 18 and the time required to obtain an output from comparator 31. The delayed pulses from delay means 56 then are coupled into azimuth coder 57, a digital counter for example, which produces a digital signal corresponding to the number of delayed azimuth sector pulses coupled thereto. Multiple outputs from azimuth coder 57 are respectively coupled to individual normally closed gates 60, said gates being controlled by the output pulses from comparator 31. When comparator 31 produces an output pulse, gates 60 are opened and pass a digit azimuth code signal to storage means 52, the azimuth code signals corresponding to the position of the antenna beam when its center intercepted a given target. The information in storage means may be coupled on command to a utilization device 53 for subsequent use.

Although the previous discussion has dealt with the use of the invention to determine the azimuth information, it is obvious that this invention is equally applicable to determine elevational information for a different type of scanning of the antenna beam.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In a scanning-type, pulsed object locating system wherein the transmitted pulse repetition rate is considerably gerater than the scanning rate of the antenna beam of the system, and wherein a receiver produces a series of output pulses in response to a series of input pulses of electromagnetic waves received from a remotely located object intercepted by the scanning antenna beam, the pulses of said series varying in magnitude from low values at each end of the series as the antenna beam center respectively approaches and then progresses away from the target to a maximum value substantially midway in the series when the antenna beam center is at the same azimuth as the target, comprising in combination first and second recirculating delay line integrators each coupled to receive the series of output pulses from said receiver and each having a circulating delay time substantially equal to the pulse repetition interval of said input series of pulses, the second one of said integrators having a loop gain less than unity and higher than that of the first integrator, means for attenuating the output pulses from said second integrator to assure that the first one of the attenuated pulses that exceeds the magnitude of a simultaneously occurring pulse from the first integrator occurs at a time after the commencement of the output pulses from both of said integrators, means coupled to receive said attenuated pulses and the output pulses of said first integrator and operating in response to the pulses applied thereto to produce an output pulse only when the magnitude of an attenuated pulse exceeds the magnitude of a simultaneously occurring pulse from said first integrator, and means responsive to the first output pulse of said last-named means to prohibit a further output therefrom during the time of receipt of the remainder of the pulses of said series.

2. The combination claimed in claim 1 further including a cathode ray tube indicator for providing a visual display of a remotely located object intercepted by said scanning antenna beam, a sweep generating circuit coupled to said indicator and to said transmitter and operating in response to a transmitter pulse to generate a sweep voltage for radially deflecting the electron beam of said cathode ray tube, said comparator being coupled to said indicator to provide a visual indication for each pulse produced by said comparator, and means operating in synchronism with said scanning antenna for deflecting the indicator electron beam in azimuth, said last-named means being operable to cause the indication of a pulse from said comparator to be displayed on said indicator at an azimuth angle corresponding to the azimuth position of the scanning antenna beam when its center was substantially at the azimuth position of said remotely located object.

3. In a scanning-type object locating system the combination comprising a transmitter and a receiver for respectively producing and detecting pulses of electromagnetic waves, a scanning antenna coupled to said transmitter and receiver for radiating and receiving said pulses in a scanning antenna beam, the rate of occurrence of pulses produced by said transmitter being considerably greater than the rate of scan of said antenna beam whereby a series of pulses are reflected from a remotely located object intercepted by said scanning antenna beam, first and second recirculating delay line integrators having different loop gains both less than one and each integrator coupled to receive detected pulses from said receiver, the circulation time of pulses in each of said integrators being substantially equal to the pulse repetition interval of pulses from said transmitter, means for attenuating the output pulses from the integrator having the higher loop gain, comparator means coupled to receive said attenuated pulses and the output pulses from the other one of said integrators for producing an output pulse only when the magnitude of an attenuated pulse exceeds the magnitude of a simultaneously occurring pulse from the other integrator, and means for coupling the first output pulse of said comparator means to the integrator having the higher loop gain to clear a recirculating pulse therefrom.

4. In a scanning-type, pulsed object locating system wherein the transmitted pulse repetition rate is considerably greater than the scanning rate of the antenna beam of the system, the combination comprising a receiver for producing output pulses in response to a series of pulses of electromagnetic waves received from a remotely located object intercepted by the scanning antenna beam, first and second recirculating delay line integrators each coupled to receive output pulses from said receiver and each having a circulating delay time substantially equal to the pulse repetition interval of said series of received pulses, the second one of said integrators having a loop gain less than unity and higher than that of the first integrator, means for attenuating the output pulses from said second integrator, comparator means coupled to receive said attenuated pulses and the output pulses of said first integrator and operating in response to the pulses applied thereto to produce an output pulse only when the magnitude of an attenuated pulse exceeds the magnitude of a simultaneously occurring pulse from said first integrator, and means responsive to the first output pulse of said comparator means to prohibit a further output therefrom during the time of receipt of the remainder of the pulses of said series.

No references cited.